United States Patent
Mopur et al.

(10) Patent No.: US 12,088,476 B2
(45) Date of Patent: *Sep. 10, 2024

(54) INTELLIGENT LIFECYCLE MANAGEMENT OF ANALYTIC FUNCTIONS FOR AN IOT INTELLIGENT EDGE WITH A HYPERGRAPH-BASED APPROACH

(71) Applicant: Hewlett Packard Enterprise Development LP, Spring, TX (US)

(72) Inventors: Satish Kumar Mopur, Karnataka (IN); Saikat Mukherjee, Karnataka (IN); Gunalan Perumal Vijayan, Karnataka (IN); Sridhar Balachandriah, Karnataka (IN); Ashutosh Agrawal, Karnataka (IN); KrishnaPrasad Lingadahalli Shastry, Karnataka (IN); Gregory S. Battas, Fishers, IN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/933,934

(22) Filed: Sep. 21, 2022

(65) Prior Publication Data

US 2023/0017701 A1   Jan. 19, 2023

Related U.S. Application Data

(63) Continuation of application No. 16/152,394, filed on Oct. 4, 2018, now Pat. No. 11,469,969.

(51) Int. Cl.
*H04L 41/16* (2022.01)
*G06N 20/00* (2019.01)
(Continued)

(52) U.S. Cl.
CPC .......... *H04L 41/16* (2013.01); *G06N 20/00* (2019.01); *H04L 41/0816* (2013.01);
(Continued)

(58) Field of Classification Search
CPC ... H04L 41/16; H04L 43/091; H04L 41/0816; H04L 41/22; H04L 43/045; H04L 67/125; G06N 20/00
(Continued)

(56) References Cited

U.S. PATENT DOCUMENTS 9,547,828 B2   1/2017   Mermoud et al.
9,563,854 B2   2/2017   Cruz et al.
(Continued)

OTHER PUBLICATIONS

Abdullah et al., "Graph Neural Networks-based Clustering for Social Internet of Things", Aug. 1, 2020, IEEE, 2020 IEEE 63rd International Midwest Symposium on Circuits and Systems (MWSCAS) (pp. 1056-1059) (Year: 2020).*
(Continued)

*Primary Examiner* — Davoud A Zand
(74) *Attorney, Agent, or Firm* — Hewlett Packard Enterprise Patent Department

(57) ABSTRACT

The disclosure relates to a framework for dynamic management of analytic functions such as data processors and machine learned ("ML") models for an Internet of Things intelligent edge that addresses management of the lifecycle of the analytic functions from creation to execution, in production. The end user will be seamlessly able to check in an analytic function, version it, deploy it, evaluate model performance and deploy refined versions into the data flows at the edge or core dynamically for existing and new end points. The framework comprises a hypergraph-based model
(Continued)

as a foundation, and may use a microservices architecture with the ML infrastructure and models deployed as containerized microservices.

20 Claims, 6 Drawing Sheets

(51) Int. Cl.
*H04L 41/0816* (2022.01)
*H04L 41/22* (2022.01)
*H04L 43/045* (2022.01)
*H04L 43/091* (2022.01)
*H04L 67/125* (2022.01)

(52) U.S. Cl.
CPC ............ *H04L 41/22* (2013.01); *H04L 43/045* (2013.01); *H04L 43/091* (2022.05); *H04L 67/125* (2013.01)

(58) Field of Classification Search
USPC .......................................................... 370/255
See application file for complete search history.

(56) References Cited

U.S. PATENT DOCUMENTS

| | | | | |
|---|---|---|---|---|
| 10,956,132 | B1* | 3/2021 | Schneider | ................. G06F 8/40 |
| 2007/0220034 | A1 | 9/2007 | Iyer et al. | |
| 2016/0342906 | A1* | 11/2016 | Shaashua | .............. H04L 67/306 |
| 2017/0060574 | A1 | 3/2017 | Malladi et al. | |
| 2017/0061329 | A1 | 3/2017 | Kobayashi et al. | |
| 2017/0063886 | A1 | 3/2017 | Muddu et al. | |
| 2017/0330109 | A1 | 11/2017 | Maughan et al. | |
| 2018/0032908 | A1 | 2/2018 | Nagaraju et al. | |
| 2018/0136617 | A1 | 5/2018 | Xu et al. | |
| 2018/0137858 | A1* | 5/2018 | Saxena | ............... H04L 12/2816 |
| 2018/0219889 | A1 | 8/2018 | Oliner et al. | |
| 2019/0174449 | A1* | 6/2019 | Shan | ..................... H04W 60/04 |
| 2020/0099709 | A1 | 3/2020 | Vasseur et al. | |
| 2020/0405204 | A1 | 12/2020 | Howard | |
| 2021/0184958 | A1 | 6/2021 | Kolar et al. | |

OTHER PUBLICATIONS

Accenture labs, "Find Your Edge, Bringing Analytics to Data at the Edge of IoT", (Research Paper), Retrieved on Jun. 4, 2018, 17 pages.
Ajit Jaokar "The Evolution of IoT Edge Analytics: Strategies of Leading Players", (Research Paper), Sep. 2016, 13 pages.
Bhatia, R., "Edge Analytics—Taking Data Processing From Cloud to Edge of Network", (Research Paper), Feb. 15, 2017, 10 pages.
Deploy an Azure Machine Learning Model to an Azure Iot Edge Device, (Research Paper), Jan. 2, 2018, 3 Pgs.
Jung et al., "Hypergraph-based overlay network model for the Internet of Things", 2015 IEEE 2nd World Forum on Internet of Things, 2015, 6 pages.
Natural Intelligence, "Change Happens: Adaptability of Machine Learning Models", available online at <http://www.naturalsemi.com/2018/01/04/change-happens-adaptability-machine-learning-models/>, (Research Paper), Jan. 4, 2018, 8 pages.
Oyekanlu et al., Towards Statistical Machine Learning for Edge Analytics in Large Scale Networks: Real-Time Gaussian Function Generation with Generic DSP, (Research Paper), 2018, 1 page.
Qu et al., "A Hypergraph-Based Blockchain Model and Application in Internet of Things-Enabled Smart Homes", Sensors, 2018, 18 pages.
Rikard Konig, "Edge Analytics for IoT", (Research Paper), Retrieved on Jun. 4, 2018, 13 pages.

* cited by examiner

INTELLIGENT LIFECYCLE MANAGEMENT OF ANALYTIC FUNCTIONS FOR AN IOT INTELLIGENT EDGE WITH A HYPERGRAPH-BASED APPROACH

CROSS REFERENCE TO RELATED APPLICATIONS

This application is a continuation of, and claims the priority benefit of U.S. patent application Ser. No. 16/152,394, filed on Oct. 4, 2018, issued as U.S. Pat. No. 11,469,969 the contents of which is incorporated herein by reference in its entirety.

DESCRIPTION OF RELATED ART

In an Internet of Things "IoT" environment, endpoints may include devices/sensors on a person, buildings, machines, a manufacturing plant, etc. that are often located far from IT environments. These sensors are large in number can create an enormous volume of data such as sensor readings which are invaluable to analytics.

Conventional cloud-based environments have been used to support the full lifecycle of analytic model development and deployment of machine-learned ("ML") models into event streams. These solutions are however at a "cloud centric IoT Core", or at a Core Data Center. Because IoT events can be both voluminous and latency sensitive, these solutions are not responsive to changes that may be necessary close to the source of the data.

The analytic models and data processors with associated frameworks need to deployed, updated and refreshed based on assessment of Data Experts, for new endpoints and with new data flows added to the environment. Further, these models and data processors need to be benchmarked, version managed and tested before being deployed into production and monitored after they go live. Manually tracking, deploying and managing lifecycle of several models with different frameworks and multiple versions becomes cumbersome, time consuming and error prone owing to scale of data processors, ML models and changing complex networks. This hinders the ability of an IoT system to rapidly and efficiently obtain insight into data for real time actions.

Hence complex, large scale, and changing IoT networks need a cohesive framework that manages the lifecycle of data processors and ML models across the Intelligent Edge and Core Devices, while representing the current state of an intelligent edge, enabling easy tracking and change management. These and other problems exist with conventional ML systems.

DETAILED DESCRIPTION OF THE INVENTION

In accordance with various embodiments, a system is provided for dynamic management of ML functions and modeling for the IoT Intelligent Edge that is able to capture the full lifecycle of the analytic functions, from creation to execution via hypergraphs. Using the system, an end user will be able to deploy one or more analytic functions, maintain versions of these functions, evaluate model performance and deploy refined versions into the data flows at the edge or core dynamically for existing and new end points.

The system may provide a framework with a hypergraph-based graph model as a foundation for dynamic management of data processors and ML models for the IoT intelligent edge that addresses management of their lifecycle from creation to execution, in production. The data processors and ML models will be together referred to as "analytic functions." The lifecycle management by a user of the analytic functions broadly covers check-in of a versioned analytic function and its deployment, enabling assessment of resource consumption of the functions, and updating refined versions into the data flows at the edge or core. In some instances, the framework may use a hypergraph-based model as a foundation, and a microservices architecture with the ML infrastructure and models deployed as containerized microservices on top of that foundation.

The hypergraph-based approach facilitates efficient lookup of associations across physical components (modeled as hypergraph virtual nodes), and connectivity, data flow function sets and attributes of the physical components. The hypergraph-based approach further enables an ability to assess latency or resource consumption across a data path set of a component or per function to enable, for example, rapid deployment of dataflow path sets depending on which device specified in the affinity rules has necessary available resources. This is especially effective in resource constrained edge devices. The approach may further provide for version management of functions and tracking on a per node basis, and inter-component and inter function dependency assessments. Various types of attributes may be modeled using the hypergraph-based approach, including security attributes associated with each path set.

Figure 1:
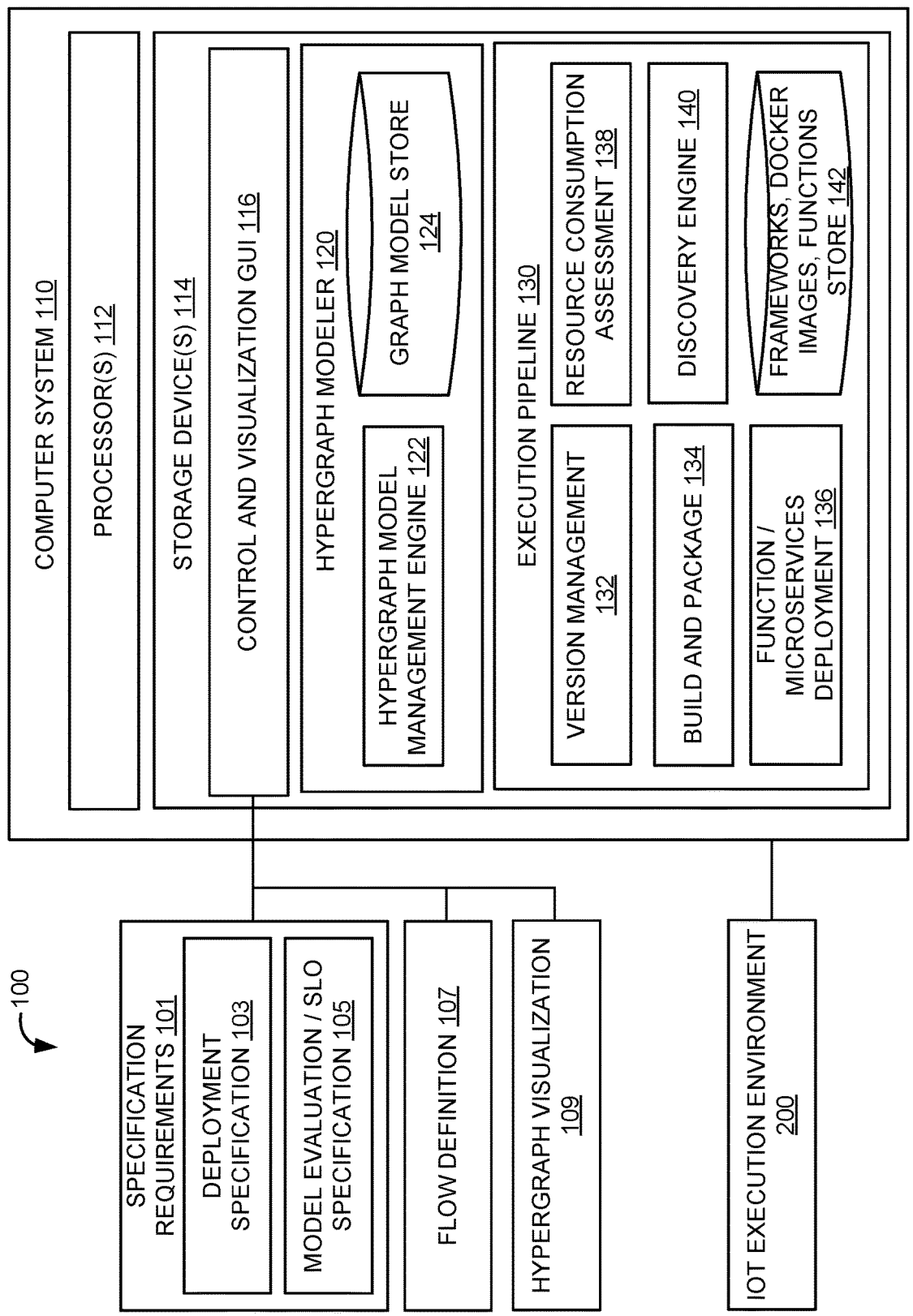
FIG. 1 illustrates an example of a system of managing an IoT environment using a hypergraph-based approach, according to an implementation of the disclosure.

FIG. 1 illustrates an example of a system 100 of providing intelligent data split management of machine-learned models from datasets in an IoT environment 200, according to an implementation of the disclosure. System 100 may include a computer system 110 that takes as input a requirements specification 101 and a flow definition 107 to model an IoT environment 200 using a hypergraph-based approach. In particular, the computer system 110 may represent (also referred to herein as "model") a component such as an edge gateway, an edge server, a core server, etc., in the IoT environment 200 as a hypergraph. More particularly, each component may be represented as one or more hypergraph data flow virtual nodes.

The computer system 110 may include one or more processor(s) 112 (also interchangeably referred to herein as "processor 112" or "processors 112" for convenience), one or more storage devices 114 (which may store a control and visualization Graphical User Interface ("GUI") 116, a hypergraph modeler 120, and an execution pipeline 130), and/or other components. Processor(s) 112 may be programmed by one or more computer program instructions. For example, processor(s) 112 may be programmed by the control and visualization GUI 116, the hypergraph modeler 120, the execution pipeline 130, and/or other instructions.

The control and visualization GUI 116 may receive the requirements specification 101 and the flow definition 107 from a user. As such, these inputs may be user-defined. In some implementations, the control and visualization GUI 116 may provide a template with pre-filled data for the requirements specification 101 that the user can customize. Whether or not the template is provided, the requirements specification 101 may include a deployment specification 103 and a model evaluation/Service Level Objective ("SLO") specification 105.

The deployment specification 103 may include identifying information for one or more functions executed at a modeled component and an analytics function deployment specification. The identifying information may include function names (or other identifiers) as well as function version information. As such, a given function and function version used at a component may be deployed and modeled based on the deployment specification. The analytics function deployment specification may indicate a functions type (such as data processor function, ML model function, associated framework function, etc.), an analytics package name, a target node type (such as edge gateway, edge server, or IoT core at a datacenter or cloud infrastructure), a target nodes list including an affinity listing of target devices where the corresponding listed function may be deployed and an anti-affinity listing of target devices where the corresponding listed function should not be deployed.

The model evaluation/Service Level Objective ("SLO") specification 105 may include service level evaluation metrics such as, without limitation, Central Processing Unit ("CPU") threshold, a memory threshold, and/or other SLO metrics.

The flow definition 107 may define data flows across data processors, ML models and data Subscribe and Publish functions. These functions may be implemented using a flow programming framework. This data flow may be imported by the discovery engine 140 based on a user trigger.

In some implementations, the control and visualization GUI 116 may generate a hypergraph visualization 109 based on the hypergraphs described herein. As such the hypergraph visualization 109 may, in some implementations, provide a visualization that mirrors the structure of the hypergraphs described herein. In particular, the hypergraph visualization 109 includes a visual depiction of the IoT environment 200 (and the various components therein). For example, the hypergraph visualization 109 may provide a high level view that can be visualized as an illustration of physical connectivity, with the hypergraph virtual nodes (as will be described herein) displayed as icons or other selectable display object. The hypergraph visualization 109 may receive a selection of an icon and provide an expanded view of the corresponding virtual node and its associated attributes. Deployment can be made as a drag and drop into each node/virtual node, and resource statistics monitoring may be visualized using the hypergraph visualization 109.

In some instances, the hypergraph visualization 109 may provide displays that provide a user with analytics responses of ML models on data at each device with models served at edge gateways or edge servers while data is trained at the IoT core of the IoT environment 200. As one example, the user observes ML model prediction output at an edge server via the hypergraph visualization 109. The user may evaluate multiple ML models trained at the IoT Core and executed at the edge across multiple model versions on their prediction accuracy. The user may select a better performing model, update the edge servers with the selected model, and check in the new version of the ML model. These and other changes may be updated in the hypergraph structure by hypergraph model management engine 122. The user may then perform a model update by triggering a deployment feature to deploy the new ML model version, and the same is updated in the graph structure as the active ML model version.

The hypergraph modeler 120 may include a hypergraph model management engine 122, which generates hypergraph representations and stores them in a database, such as the graph model store 124. The hypergraph model management engine 122 may generate a graph structure with physical components representing vertices and inter connectivity as graph edges are constructed using the discovered data.

For each set of data flows with analytic functions defined by the user as being associated with a component of the IoT environment 200, a hypergraph structure is constructed and associated to that component as a data flow virtual node. An attribute virtual node is constructed and updated with the identity, deployment and performance evaluation specification data specified by the deployment specification 103 and the model evaluation/SLO specification 105. This is then associated to each of the data processors and ML models as association links, and a snapshot stored may be at the associated vertex of the hypergraph.

The execution pipeline 130 may include various functionality such as version management 132, build and package 134, function and microservices deployment 136, resource consumption 138, discovery engine 140, and frameworks, docker images, and function store 142.

The version management 132 may be implemented a Representational State Transfer ("REST") based microservice with support for check in, check out, update and delete operations for the analytic functions. The user develops the analytic functions (such as data processors in data streaming path and ML models for analytic requirements such as prediction) in the user's development environment. The user may check in functions associated with components in the IoT environment (e.g., edge or core devices) using the version management interfaces into the repository for the ML models and data processor functions. The hypergraph model management engine 122 may then updated with the versions of the functions expected to be deployed to each of the components.

The build and package 134 may build and create packages for the analytics functions such as the data preprocessors in the data flow and ML models with associated frameworks, which may be packaged as containers or standalone binaries and automatically versioned. The user may then trigger a functions deployment feature to deploy the packages. The functions deployment feature communicates to the hypergraph model management engine 122 to assess and fetch the target deployment node details as per specified affinity/anti affinity rules from the requirements specification 101. It then deploys the functions using a Hyper Text Transfer Protocol ("HTTP") based approach for ML models or binaries, and containers for containerized microservices.

The function and microservices deployment 136 may build and package frameworks in which the ML models are trained and served as containerized microservices. The ML functions/microservices may be deployed on edge devices based on a placement definition template, values for which may be specified by the user, such as in the requirements specification 101.

The resource consumption assessment 138 may monitor the CPU, Memory, and/or other SLO resource consumed by each of the analytic functions, and, connected set of the functions in each dataflow virtual node hypergraph. It compares the same with the resource usage specified by the model evaluation/SLO specification 105 for the relevant function for adherence and reports any adherence violations to the user.

The resource consumption assessment 138 may assess resource consumption of all analytic functions per device, for all devices, and records the same in the graph structure using the graph management engine per device. It reports the resource consumption trends for all nodes in an affinity set, and SLO violations. This enables a user to assess resource consumed across a connected set of functions (per hypergraph) and enable a user to choose optimal placement for such sets if SLOs violated on that node.

The discovery engine 140 may be used to discover various new or previously unknown components in the IoT environment 200. As such, the user or system may import the components (e.g., endpoints, edge gateways, edge servers, or IoT core device) ingest points with their connectivity information.

The frameworks, docker images, and function store 142 may store the various frameworks, docker images (for containerized implementations), and analytic functions described herein. In this manner, frameworks, docker images, and analytic functions may be deployed from or otherwise stored by the system for later retrieval.

Figure 2:
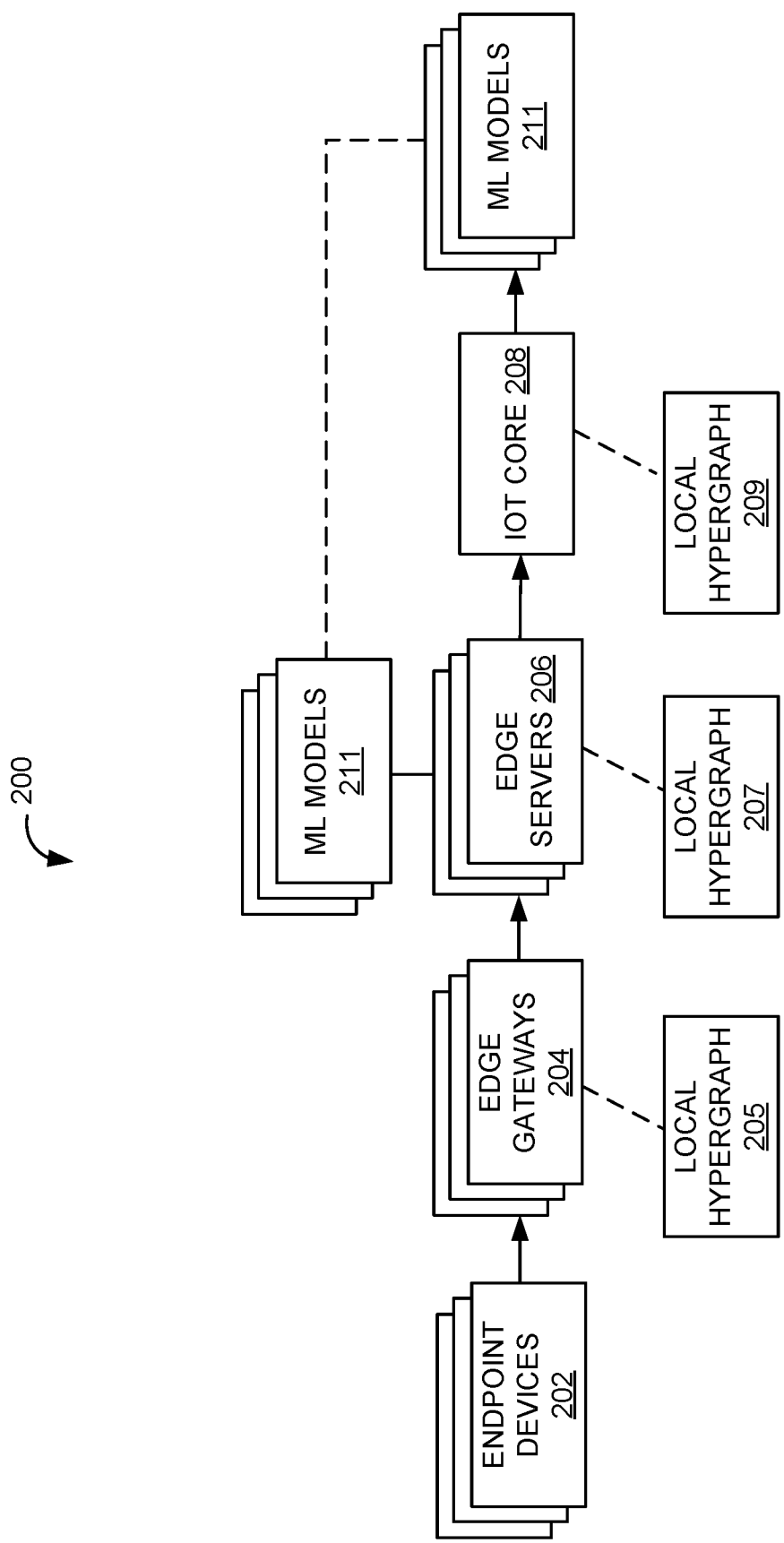
FIG. 2 illustrates an example of an IoT environment modeled using a hypergraph-based approach, according to an implementation of the disclosure.

FIG. 2 illustrates an example of an IoT environment 200 modeled using a hypergraph-based approach, according to an implementation of the disclosure. In the Figures, like reference symbols throughout this disclosure represent the same elements. In the example that follows, the endpoint devices 202 will be described as sensor devices, in the IoT environment 200, that each produce sensor data collected by the edge devices 204 and used to train, validate, and test ML models 211 relating to the sensor data. The ML models 211 in these examples may each model various aspects of the sensor data. For example, the ML models 211 may be trained to predict when a sensor will fail, when a device monitored by a sensor will fail, when sensor data indicates a dangerous condition exists (e.g., imminent or actual collision or other emergency situation), etc. It should be noted, however, that the endpoint devices 202 are not limited to sensor devices, and the ML models 211 are not limited to modeling sensor data.

In an implementation, as illustrated in FIG. 2, the IoT environment 200 may include one or more endpoint devices 202, one or more edge gateways 204, one or more edge servers 206, an IoT core 208, and/or other components. Generally speaking, the edge gateways 204, edge servers 206, and IoT core 208 may perform various analytic functions modeled as hypergraphs. These functions may include, for example, data preprocessing functions and training, validating, and testing ML models 211, which are us. The analytic functions may be used for preprocessing, diagnostics, classification or prediction with their associated ML frameworks for training/serving the ML models.

Endpoint devices 202 may include devices at the end of a network that is a source of data. These endpoint devices may include an IoT device that generates IoT data, such as a sensor device that generates sensor data. In an implementation, sensor data may be produced by the endpoint device 202, which may include a sensor device. The sensor data may include operational data associated with itself (e.g., diagnostic data, battery data, etc.), sensed data of another device, sensed data of an environment, and/or other types of sensor data. The sensor data may be collected by an edge gateway 204 and/or edge server 206. An edge gateway 204 may include devices that typically have limited processing capability and perform data aggregation from end points, and perform pre-processing of the aggregated data such as noise elimination and analytic functions such as critical threshold crossings of parameters. The edge gateway 204 may route the pre-processed data to the edge server 206 and/or ultimately to the IoT core 208.

The edge server 206 may perform real time analytics to predict an impending failure by analyzing sensor parameters using ML models 211, which may be generated at IoT core 208 based on the endpoint data. The IoT core 208 may operate at a remote data center or cloud infrastructure can perform training of ML models 211 and update the edge server 206 with refined ML models 211 for improved prediction performance.

Various components in the IoT environment 200 may be modeled as hypergraphs. For example, each edge gateway 204 may be modeled as one or more local hypergraphs 205, each edge server 206 may be modeled as one or more local hypergraphs 207, and the IoT core 208 may be modeled as one or more local hypergraphs 209. The local hypergraphs 205, 207, and 209 may each use hypergraph modeling. For example, each of the local hypergraphs 205, 207, and 209 may model their respective components as hypergraph data flow virtual nodes, as will be described with respect to FIGS. 3 and 4.

Figure 3:
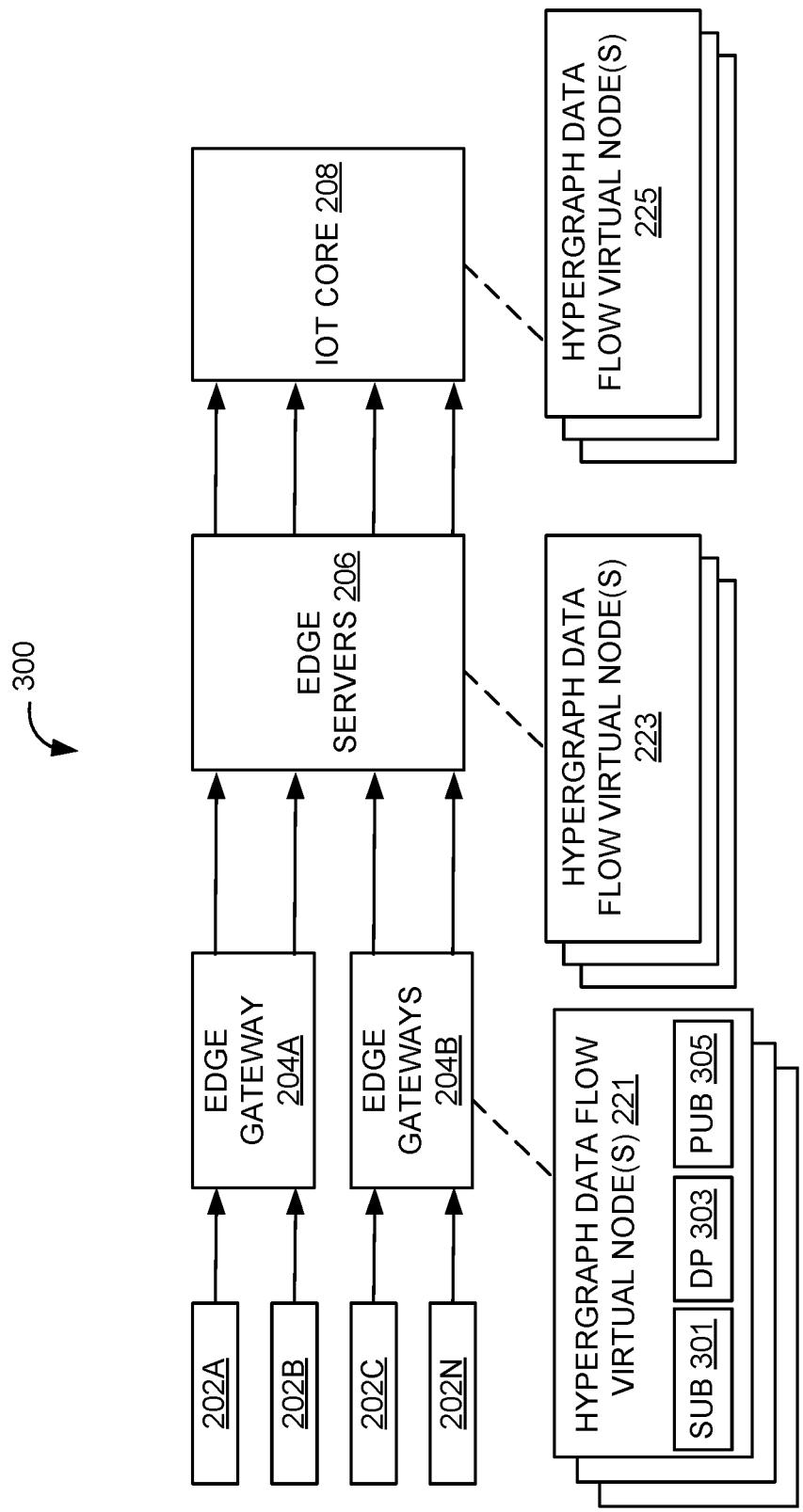
FIG. 3 illustrates a schematic diagram of representing components of an IoT environment using hypergraph data flow virtual nodes, according to an implementation of the disclosure.

FIG. 3 illustrates a schematic diagram 300 of representing components of an IoT environment using hypergraph data flow virtual nodes, according to an implementation of the disclosure. In an implementation, each of the edge gateways 204 may be represented as one or more hypergraph data flow virtual nodes 221, each of the edge servers 206 may be represented as one or more hypergraph data flow virtual nodes 223, and the IoT core 208 may be represented as one or more hypergraph data flow virtual nodes 225. It should be noted that only edge gateway 204B is illustrated with a virtual node representation for clarity even though edge gateway 204A will have one as well. It is further noted that only one edge server 206 and corresponding edge gateways 204 is illustrated even though multiple edge servers 206 each with their own flows and edge gateways 204 will be represented as hypergraph virtual nodes as well.

The IoT core 208 may generate one or more ML models 211 based on data originating from endpoint devices 202, which may be used at edge servers 206. Because each of the dataflows in and out of a given component such as an edge gateway 204, edge server 206, and IoT core 208 is different, the corresponding hypergraph data flow virtual nodes will be different as well.

The hypergraph-based approach according to examples in the present disclosure has a representation scheme as follows. An example graph represents e2e representation of physical connectivity of different types of devices, i.e., Graph G={Vertices GV, Edges GE} wherein: GV={endpoints 202, edge gateways 204, edge servers 206, and IoT Core 208 (which may be implemented as a virtual machine and/or cloud based compute nodes)}; and GE={network connections across GV}. A Vertex $GV_i$, such as an edge gateway 204 of the graph may comprise a set of hypergraphs $HG_i$. Each hypergraph is represented as a Virtual Node VN, with data paths including data subscriptions (illustrated as Sub 301) and data publication (illustrated as PUB 305). A set of data processing and ML functions may be modeled as hypergraphs with its interconnecting paths deployed on the edge gateway 204 or edge server 206, referred to as a data flow virtual node, wherein: DF VN={Vertices DFV, Edges DFE}. It should be noted that DFV={data processors (illustrated as DP 303), ML models 211}; DFE={paths across analytic functions i.e. data processors and ML Models}. Each Edge GE to/from a Vertex GV of a hypergraph may map to one or more DFEs. Each VN may have a link (edge) pointing to the parent vertex GV. A snapshot of all $HG_i$ belonging to a Vertex may be stored in the vertex device as well.

The foregoing representations may be generated by the hypergraph model management engine 122. The graph management engine can store the constructed structures in a database or graph database such as the graph model store 124. The user may then presented with the IoT execution environment 200, which comprises the visually depicted graph for ease of management.

Figure 4:
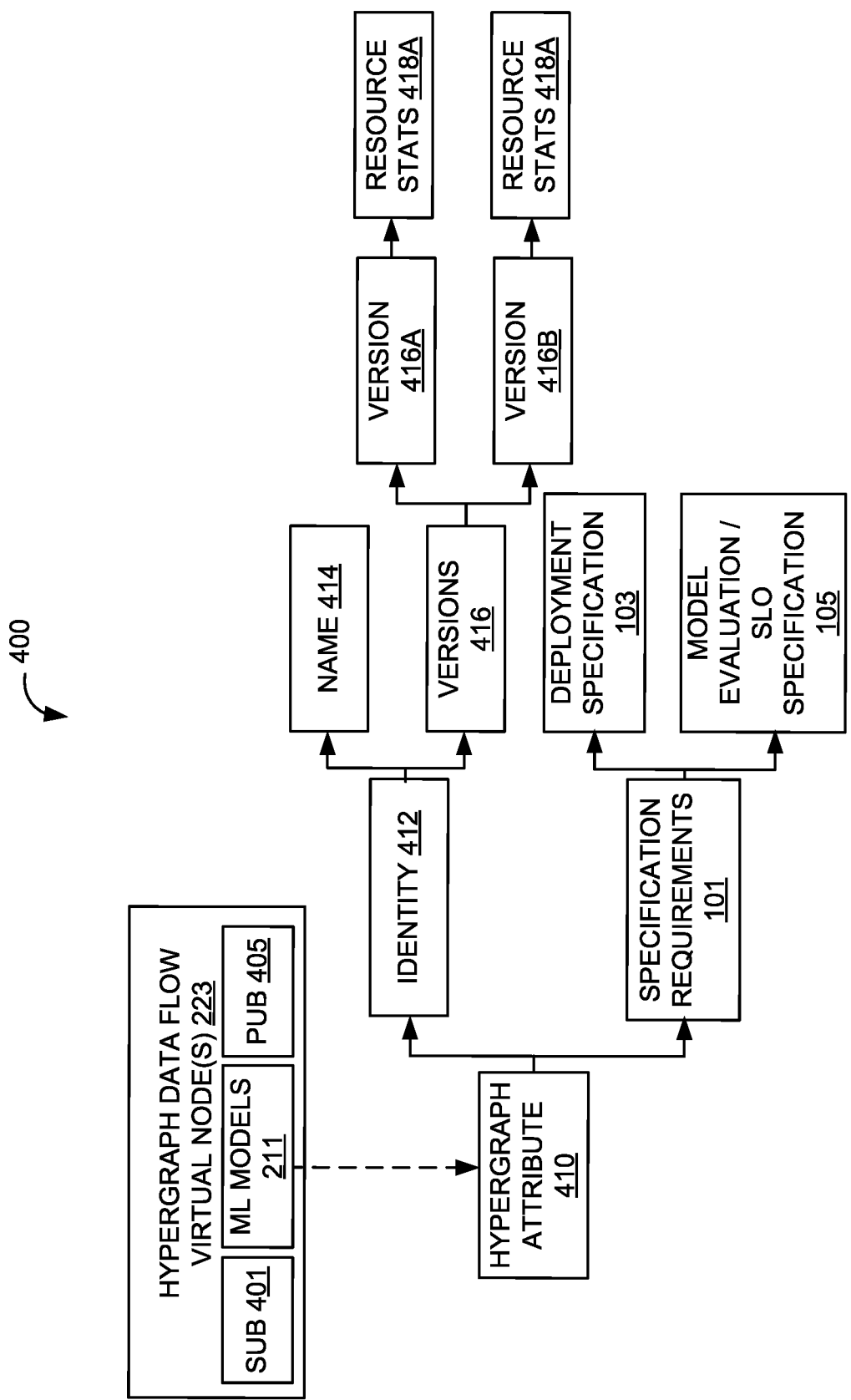
FIG. 4 illustrates a schematic diagram representing hypergraph attributes of hypergraph data flow virtual nodes, according to an implementation of the disclosure.

FIG. 4 illustrates a schematic diagram 400 representing hypergraph attributes of hypergraph data flow virtual nodes, according to an implementation of the disclosure. While only hypergraph data flow virtual node 223 is illustrated, attributes of other hypergraph data flow virtual nodes (e.g., hypergraph data flow virtual node 225) may be similarly modeled. Data paths, including data subscriptions (illustrated as Sub 401) and data publication (illustrated as pub 405) may be modeled in a virtual node. An attribute 410 such as those functions related to ML models 211 may be graphed as well. Other attributes may be similarly modeled, such as those pertaining to data processing functions. Another branch may store a set of attributes corresponding to each data processing or an ML function, referred to as Attribute Virtual Node AVN, wherein AVN={Vertices AV, Edges AE}, in which AV={Identity, deployment specification 103, model evaluation/SLO specification 105, and resource consumption statistics.}, and AE={associations links such as identity information, or KV Pairs for Values for AV such as resource consumption statistics.}.

Using the foregoing representation of a hypergraph attribute 410, the system may store and retrieve as in a hypergraph format an identity 412 of a function, its name 414, versions 416 (illustrated as different versions 416A, 416B), and corresponding resource statistics (illustrated as resource statistics 418A, 418B). Hypergraph attribute 410 may also model the specification requirements 101, including corresponding deployment specification 103 and model evaluation/SLO specification 105. In this manner, the various specifications, functions, and function versions involved in generating the ML model 211 to which the hypergraph attribute 410 relates may be represented using a hypergraph approach, making lookup of this information efficient even across an IoT network. This further enables a user to obtain resource usage information to determine whether an ML model 211 is performing as desired and what specifications and functions were used to train, validate, and test the ML model in question.

Figure 5:
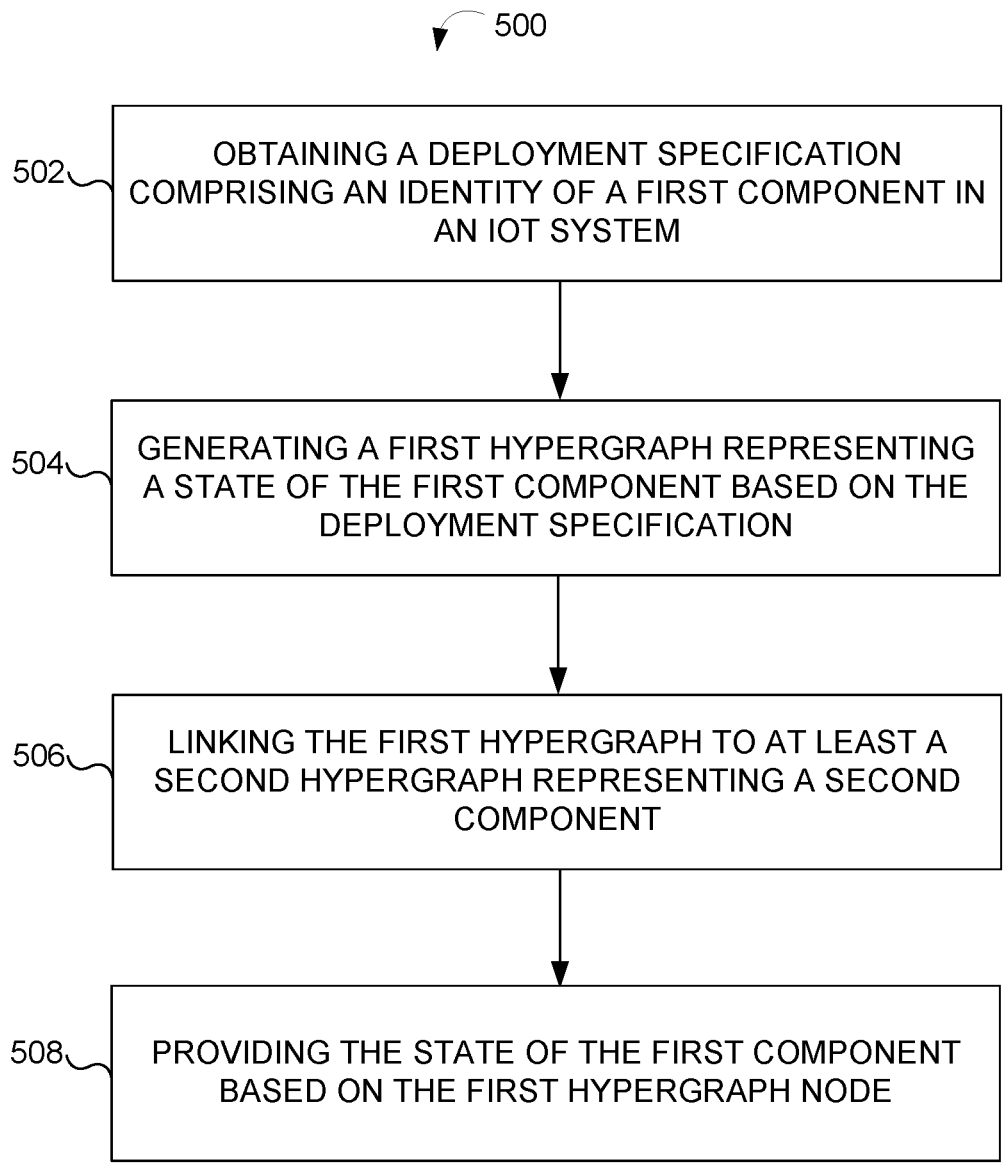
FIG. 5 illustrates a process of managing an IoT environment using a hypergraph-based approach, according to an implementation of the disclosure.

FIG. 5 illustrates a process 500 of managing an IoT environment using a hypergraph-based approach, according to an implementation of the disclosure.

In an operation 502, process 500 may include obtaining a deployment specification comprising an identity of a first component in an IoT system. The deployment specification may include identifying information for one or more functions executed at a modeled component and an analytics function deployment specification. The identifying information may include function names (or other identifiers) as well as function version information. As such, a given function and function version used at a component may be deployed and modeled based on the deployment specification. The analytics function deployment specification may indicate a functions type (such as data processor function, ML model function, associated framework function, etc.), an analytics package name, a target node type (such as edge gateway, edge server, or IoT core at a datacenter or cloud infrastructure), a target nodes list including an affinity listing of target devices where the corresponding listed function may be deployed and an anti-affinity listing of target devices where the corresponding listed function should not be deployed.

In an operation 504, process 500 may include generating a first hypergraph representing a state of the first component based on the deployment specification. For example, one or more components such as an edge gateway 204, an edge server 206, and an IoT core 208 may each be represented as one or more hypergraph data flow virtual nodes.

In an operation 506, process 500 may include linking the first hypergraph to at least a second hypergraph representing a second component. For example, each hypergraph data flow virtual node may link to a parent hypergraph data flow virtual nodes (which may represent a parent component). In some instances, these link may be represented as a hypergraph edge.

In an operation 508, process 500 may include providing the state of the first component based on the first hypergraph node. For example, the representation using hypergraph approach may enable rapid identification of dataflows, function identifications, ML model identifications, ML model versions used, and/or other state information of a given component represented as a hypergraph data flow virtual node.

The described operations, such as those illustrated in FIG. 5 and described above, may be accomplished using some or all of the system components described in detail herein and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting. It is to be expressly understood that the drawings are for the purpose of illustration and description only and are not intended as a definition of the limits of the invention.

Figure 6:
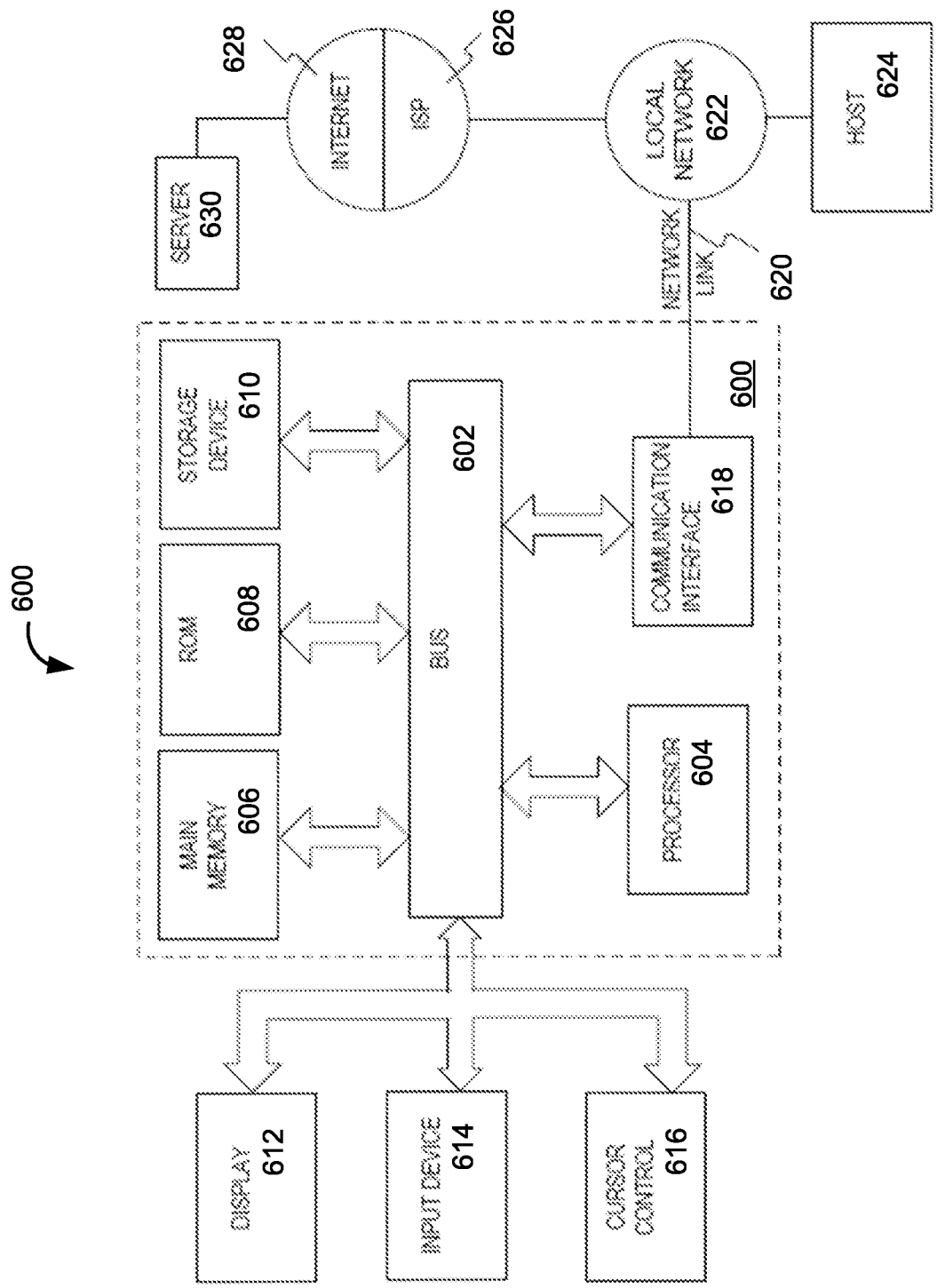
FIG. 6 depicts a block diagram of an example computer system 600 in which any of the embodiments described herein may be implemented.

FIG. 6 depicts a block diagram of an example computer system 600 in which any of the embodiments described herein may be implemented. For example, the various components illustrated in FIGS. 1-3 may be implemented according to the computer system 600. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface component to implement a GUI that may be stored in a mass storage device as executable software codes that are executed by the computing device(s). This and other components may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicate with a WAN). Wireless links may also be implemented. In any such implementation, network interface 618 sends and receives electrical, electromagnetic or optical signals that carry digital data streams representing various types of information.

A network link 620 typically provides data communication through one or more networks to other data devices. For example, a network link may provide a connection through local network to a host computer 624 or to data equipment operated by an Internet Service Provider (ISP) 626. The ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server 630 might transmit a requested code for an application program through the Internet 628, the ISP 626, the local network 622 and the communication interface 618.

The received code may be executed by processor 604 as it is received, and/or stored in storage device 610, or other non-volatile storage for later execution.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method, comprising:
    obtaining a deployment specification comprising an identity of a first component in an Internet of Things (IoT) system;
    generating a plurality of hypergraphs representing a plurality of components in the IOT system based on the deployment specification, wherein each hypergraph of the plurality of hypergraphs comprises:
        one or more nodes representing data flows of functions comprised in a respective component, and
        graph edges representing interconnectivity between the respective component and other components of the plurality of components;
    linking a node of a first hypergraph representing a first component to a node of a second hypergraph representing a second component using graph edges of the first and second hypergraph; and
    providing a state of the first component based on the linking of the node of the first hypergraph.

2. The method of claim 1, wherein linking the node of the first hypergraph to the node of the second hypergraph comprises:
    obtaining a data flow path between the first component and the second component as specified in the deployment specification.

3. The method of claim 1, wherein the deployment specification comprises an identity of a function, and at least a first service level objective of the first component, wherein generating the first hypergraph comprises:
    representing the function and the first service level objective.

4. The method of claim 1, wherein the first component comprises an edge device or a core device in the IoT system, and wherein generating the first hypergraph comprises:
    modeling a set of dataflows that represent virtual paths through the first component, including a plurality of end points; and
    wherein providing the state comprises providing the set of dataflows.

5. The method of claim 1, wherein providing the state comprises:
    providing a version of each of one or more machine-learned models trained using the IoT system associated with the first component.

6. The method of claim 1, wherein providing the state comprises:
    providing an ingress component that is a source of data or an egress component to which data flows from the first component.

7. The method of claim 1, wherein the deployment specification specifies a list of components, including the first component, wherein the plurality of hypergraphs each correspond to a respective component in the list of components.

8. The method of claim 1, further comprising:
    receiving a request for an association of data flows between at least the first component;
    obtaining the data flows between the first component and at least the second component based on the first hypergraph; and
    providing the data flows between the first component and at least the second component responsive to the request.

9. A system comprising:
    a computer system having one or more processors programmed to:
        obtain a deployment specification comprising an identity of a first component in an Internet of Things (IoT) system;
        generate a plurality of hypergraphs representing a plurality of components in the IOT system based on the deployment specification, wherein each hypergraph of the plurality of hypergraphs comprises:
            one or more nodes representing data flows of functions comprised in a respective component, and
            graph edges representing interconnectivity between the respective component and other components of the plurality of components;
        link a node of a first hypergraph representing a first component to a node of a second hypergraph representing a second component using graph edges of the first and second hypergraph; and
        provide a state of the first component based on the linking of the node of the first hypergraph.

10. The system of claim 9, wherein to link the node of the first hypergraph to the node of the second hypergraph, the computer system is further programmed to:
    obtain a data flow path between the first component and the second component as specified in the deployment specification.

11. The system of claim 9, wherein the deployment specification comprises an identity of a function, and at least a first service level objective of the first component, and wherein to generate the first hypergraph, the computer system is further programmed to:
    represent the function and the first service level objective.

12. The system of claim 9, wherein the first component comprises an edge device or a core device in the IoT system, and wherein to generate the first hypergraph, the computer system is further programmed to:
    model a set of dataflows that represent virtual paths through the first component, including a plurality of end points; and
    wherein to provide the state, the computer system is further programmed to provide the set of dataflows.

13. The system of claim 9, wherein to provide the state, the computer system is further programmed to:
    provide a version of each of one or more machine-learned models trained using the IoT system associated with the first component.

14. The system of claim 9, wherein to provide the state, the computer system is further programmed to:
    provide an ingress component that is a source of data or an egress component to which data flows from the first component.

15. The system of claim 9, wherein the deployment specification specifies a list of components, including the first component, and wherein the plurality of hypergraphs each correspond to a respective component in the list of components.

16. The system of claim 9, wherein the computer system is further programmed to:
    receive a request for an association of data flows between at least the first component;

obtain the data flows between the first component and at least the second component based on the first hypergraph; and provide the data flows between the first component and at least the second component responsive to the request.

17. A non-transitory computer readable storage medium comprising instructions, when executed on a computer system, program the computer system to:

obtain a deployment specification comprising an identity of a first component in an Internet of Things (IoT) system;

generate a plurality of hypergraphs representing a plurality of components in the IOT system based on the deployment specification, wherein each hypergraph of the plurality of hypergraphs comprises:
one or more nodes representing data flows of functions comprised in a respective component, and
graph edges representing interconnectivity between the respective component and other components of the plurality of components;

link a node of a first hypergraph representing a first component to a node of a second hypergraph representing a second component using graph edges of the first and second hypergraph; and provide a state of the first component based on the linking of the node of the first hypergraph.

18. The non-transitory computer readable storage medium of claim 17, the instructions further program the computer system to:

obtain a data flow path between the first component and the second component as specified in the deployment specification.

19. The non-transitory computer readable storage medium of claim 17, wherein the deployment specification comprises an identity of a function, and at least a first service level objective of the first component, and wherein to generate the first hypergraph, the instructions further program the computer system to:

represent the function and the first service level objective.

20. The non-transitory computer readable storage medium of claim 17, wherein the first component comprises an edge device or a core device in the IoT system, and wherein to generate the first hypergraph, the instructions further program the computer system to:

model a set of dataflows that represent virtual paths through the first component, including a plurality of end points; and wherein to provide the state, the computer system is further programmed to provide the set of dataflows.

* * * * *